«12» United States Patent
Ohta

«10» Patent No.: US 9,586,148 B2
«45» Date of Patent: Mar. 7, 2017

«54» RECORDING MEDIUM, GAME PROCESSING METHOD, GAME APPARATUS AND GAME SYSTEM

«71» Applicant: NINTENDO CO., LTD., Kyoto (JP)

«72» Inventor: Keizo Ohta, Kyoto (JP)

«73» Assignee: NINTENDO CO., LTD., Kyoto (JP)

«*» Notice: Subject to any disclaimer, the term of this patent is extended or adjusted under 35 U.S.C. 154(b) by 214 days.

«21» Appl. No.: 13/859,258

«22» Filed: Apr. 9, 2013

«65» Prior Publication Data

US 2014/0141878 A1 May 22, 2014

«30» Foreign Application Priority Data

Nov. 20, 2012 (JP) ................................ 2012-254533

«51» Int. Cl.
*A63F 9/24* (2006.01)
*A63F 13/847* (2014.01)
*A63F 13/837* (2014.01)
*A63F 13/803* (2014.01)
*A63F 13/843* (2014.01)

«52» U.S. Cl.
CPC .......... *A63F 13/847* (2014.09); *A63F 13/803* (2014.09); *A63F 13/837* (2014.09); *A63F 13/843* (2014.09)

«58» Field of Classification Search
CPC .......................... A63F 2300/6623; A63F 13/00
See application file for complete search history.

«56» References Cited

U.S. PATENT DOCUMENTS

| 6,736,724 | B1* | 5/2004 | Erikawa et al. ................... 463/7 |
| 8,425,330 | B1* | 4/2013 | Kislyi et al. .................... 463/42 |
| 2007/0218965 | A1* | 9/2007 | Tilston et al. .................... 463/2 |
| 2008/0045343 | A1* | 2/2008 | Sauberman ...................... 463/42 |
| 2008/0125220 | A1* | 5/2008 | Sakaguchi ....................... 463/32 |
| 2011/0086713 | A1* | 4/2011 | Yoshimura et al. ............. 463/43 |
| 2012/0052950 | A1* | 3/2012 | Kataoka et al. ................. 463/36 |
| 2013/0005417 | A1* | 1/2013 | Schmidt .................. A63F 13/12 463/5 |

FOREIGN PATENT DOCUMENTS

| JP | 8-155146 | 6/1996 |
| JP | 9-155063 | 6/1997 |

(Continued)

OTHER PUBLICATIONS

"Super Pokemon Scramble (Pokemon Rumble Blast in English)," Weekly Famitsu No. 1182, Enterbrain, Inc., Jul. 28, 2011, vol. 26, No. 33, vol. 1182 of the set, p. 104-106.*

(Continued)

*Primary Examiner* — James S McClellan
*Assistant Examiner* — Kevin Carter
«74» *Attorney, Agent, or Firm* — Nixon & Vanderhye P.C.

«57» ABSTRACT

An example system includes an object controlling unit that controls operations of objects based on input manipulations, and a noncompetitive relationship setting unit that sets a noncompetitive relationship for two objects in the competition of the game when a predetermined operation is performed between these two objects.

That system performs processing regarding the game in which plural objects compete in accordance with the input manipulations.

26 Claims, 12 Drawing Sheets

(56) References Cited

FOREIGN PATENT DOCUMENTS

| | | |
|---|---|---|
| JP | 2000-107463 | 4/2000 |
| JP | 2000-116956 | 4/2000 |
| JP | 2004-209299 | 7/2004 |
| JP | 2011-239996 | 12/2011 |

OTHER PUBLICATIONS

"Saint Seiya Senki (Saint Seiya: Sanctuary Battle in English)," Weekly Famitsu No. 1195, Enterbrain, Inc., Oct. 27, 2011, vol. 26, No. 46, vol. 1195 of the set, p. 282-283, (document showing the well-known arts).*

Japanese Office Action issued in App. No. 2012-254533 dated Dec. 20, 2016 (w/ partial translation).

* cited by examiner ing unit 10 reads out a game
RECORDING MEDIUM, GAME PROCESSING METHOD, GAME APPARATUS AND GAME SYSTEM

CROSS-REFERENCE TO RELATED APPLICATIONS

This application is based upon and claims the benefit of priority of the prior Japanese Patent Application No. 2012-254533, filed on Nov. 20, 2012, the entire contents of which are incorporated herein by reference.

FIELD

The technology herein relates to a recording medium, game processing method, game apparatus and game system, for a game in which plural objects compete against each other.

BACKGROUND AND SUMMARY

According to an aspect of the embodiment, a recording medium is provided that records a program making a computer, based on an input manipulation, perform processing regarding a game in which plural objects compete against each other, and the program makes the computer operate as an object controlling unit controlling an operation of an object based on an input manipulation, and a noncompetitive relationship setting unit setting a noncompetitive relationship for two objects about a competition in the game when a predetermined operation is performed for the two objects.

The object and advantages of the invention will be realized and attained by means of the elements and combinations particularly pointed out in the claims. It is to be understood that both the foregoing general description and the following detailed description are exemplary and explanatory and are not restrictive of the invention.

These and other objects, features, aspects and advantages of the present technology will become more apparent by the following detailed explanation in reference to the attached figures.

DETAILED DESCRIPTION OF NON-LIMITING EXAMPLE EMBODIMENTS

Figure 1:
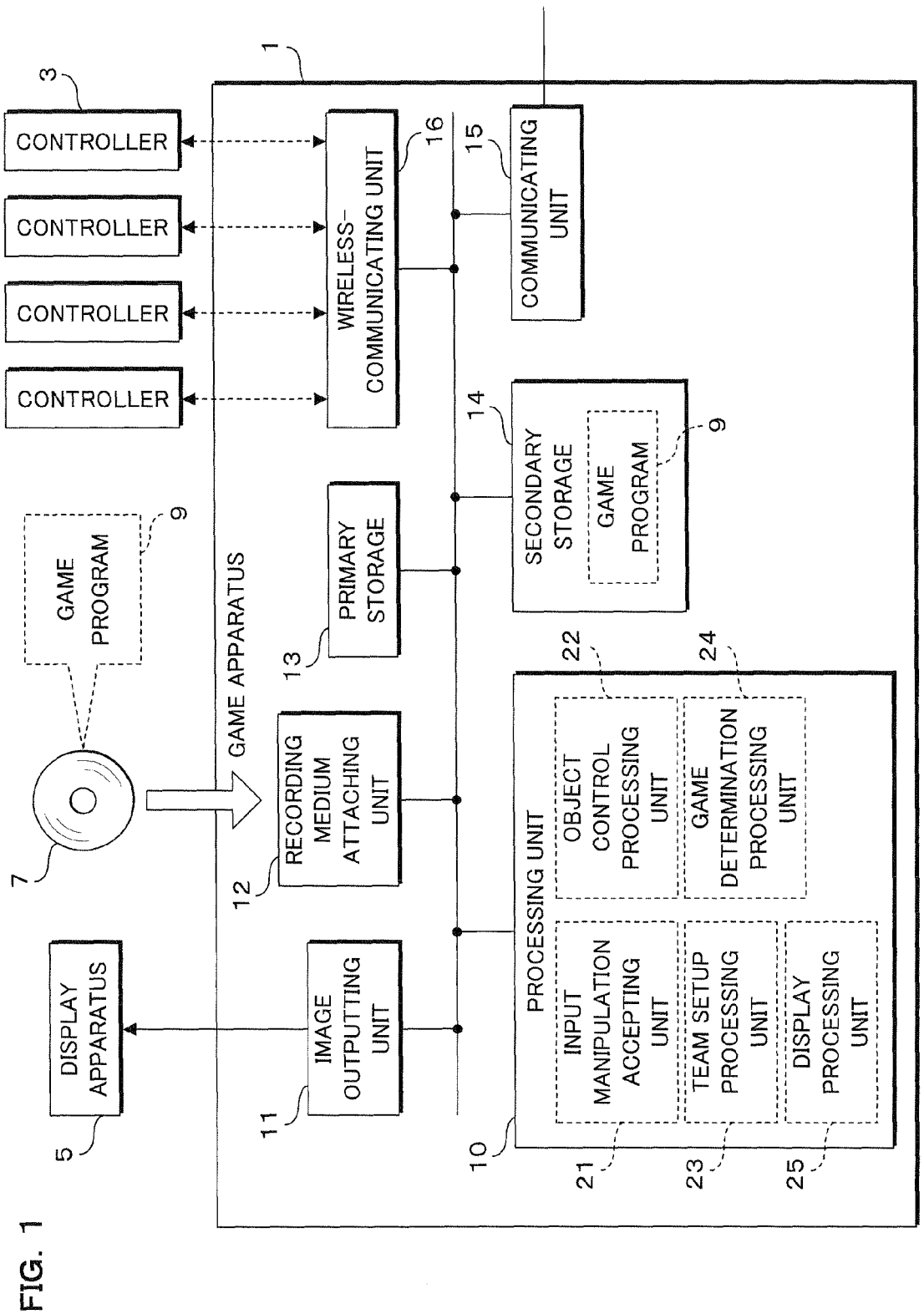
FIG. 1 shows an example non-limiting block diagram for representing a configuration of a game system according to the present embodiment.

FIG. 1 shows an example non-limiting block diagram for representing a configuration of a game system according to the present embodiment. The game system according to the present embodiment has a configuration that a stationary game apparatus 1 is connected to a display apparatus 5 through an image signal line or the like. The display apparatus 5 displays an image regarding a game output by the game machine 1. The game apparatus 1 includes plural controllers 3 for accepting user's manipulations. The game apparatus 1 and each controller 3 transmit information through wireless communication. The game apparatus 1 accepts the user's manipulation obtained through each controller 3. The game apparatus 1 performs several processing based on the accepted input manipulation, such as object control regarding the game and game determination. The game apparatus 1 generates a game image reflecting the processing result, and outputs the generated game image to the display apparatus 5.

The game apparatus 1 includes a processing unit 10, image outputting unit 11, recording medium attaching unit 12, primary storage 13, secondary storage 14, communicating unit 15, wireless communicating unit 16 and the like. The processing unit 10 of the game apparatus 1 is configured with an arithmetic processing unit, such as a CPU (Central Processing Unit). The processing unit 10 reads out a game program 9 stored in the secondary storage 14 or game program 9 stored in a recording medium 7 that is attached to the recording medium attaching unit 12, onto the primary storage 13 and then executes the read game program 9. Thus, the processing unit 10 can perform several information processing regarding the game. For example, the processing unit 10 performs processing for accepting the user's input manipulation obtained with the controller 3. For example, the processing unit 10 performs processing for determining a game based on the accepted input manipulation. For example, the processing unit 10 performs processing for generating a game image displayed on the display apparatus 5 in response to the accepted input manipulation or events occurred in the game.

The image outputting unit 11 converts the image generated by the processing unit 10 into image signals appropriate for the display of the display apparatus 5, and outputs the image signals. The recording medium attaching unit 12 can receive or release the recording medium 7 that is a disk type, card type or the like. The processing unit 10 can read out the game program 9 and other data from the recording medium 7 attached to the recording medium attaching unit 12. The primary storage 13 is configured with a semiconductor memory element or the like. The primary storage 13 temporarily stores several data generated by the calculation processing of the processing unit 10. The secondary storage 14 is configured with a non-volatile memory having a capacity larger than that of the primary storage 13. The secondary storage 14 stores, for example, the game program 9 and other data. The communicating unit 15 performs data transmission with a server device, other game apparatus 1 or the like, through the network, such as the Internet or LAN (Local Area Network). For example, the game apparatus 1 can utilize the communication unit 15 to communicate with the server device for downloading the game program 9, and can store it in the secondary storage 14.

The wireless communicating unit 16 performs wireless transmission of information with plural controllers 3 included by the game apparatus 1. For example, the controller 3 is composed of a housing that can be held by user's both hands and that has a manipulating unit, such as a push button and/or touch panel. The controller 3 includes a wireless communicating unit in the housing, and performs wireless transmission of information with the game apparatus 1. The controller 3 gives wireless notification to the game apparatus 1 about the input manipulation applied on the manipulating unit. For example, the controller 3 notifies about information, such as press or release of the push button. The wireless communicating unit 16 of the game apparatus 1 notifies the processing unit 10 about the input manipulation received from each controller 3. The game apparatus 1 includes plural controllers 3, and thus plural users can simultaneously play the game with the game apparatus 1.

The game apparatus 1 can make the processing unit 10 execute the game program 9 to implement an input manipulation accepting unit 21, object control processing unit 22, team setup processing unit 23, game determination processing unit 24, display processing unit 25 and the like, as function blocks in software. Alternatively, it may be configured that a part or the entire of the elements from the input manipulation accepting unit 21 to display processing unit 25 are implemented as functioning blocks in hardware.

The input manipulation accepting unit 21 of the processing unit 10 performs processing for accepting the user's input manipulation applied to each controller 3, based on the information transmitted between the wireless communicating unit 16 and the controller 3. For example, the input manipulation accepting unit 21 accepts an input manipulation based on the game contents, such as a manipulation for moving a player object and an action manipulation for attacking, jumping or the like. In the present embodiment, the term "player object" means an object of a character that is a target for the user's manipulation. The input manipulation accepting unit 21 distinguishes and accepts the input manipulations for each controller 3.

The object control processing unit 22 of the processing unit 10 controls the object regarding the game based on the input manipulation that is accepted by the input manipulation accepting unit 21. For example, the object control processing unit 22 makes the player object move, attack, jump or the like in accordance with the input manipulation. For example, the object control processing unit 22 additionally performs processing for generating, arranging, moving objects other than the player object, and the like. The objects other than the player object includes, for example, an enemy object, background object, obstacle object, a field object arranging these objects, and the like. In the present embodiment, the term "enemy object" means an object that is not a target of the user's manipulation.

The team setup processing unit 23 of the processing unit 10 performs a team setup for plural users in the game played by the game program 9 according to the present embodiment. The term "team setup for plural users" means a team setup for plural player objects. It will be described later about detailed processing performed by the team setup processing unit 23.

The game determination processing unit 24 of the processing unit 10 performs several determination processing regarding the game. For example, the game determination processing unit 24 performs the processing for determining whether actions such as attack, avoidance or the like of the player object performed in accordance with the input manipulation succeeds or fails. For example, the game determination processing unit 24 determines whether a condition is satisfied for win, defeat or the like in the game.

The display processing unit 25 of the processing unit 10 performs processing for displaying a game screen on the display apparatus 5, and the game screen is configured with objects arranged by the object control processing unit 22. In other words, the display processing unit 25 performs processing for generating an image in which one or more arranged objects are drawn, and for giving the generated image to the image outputting unit 11. The image outputting unit 11 converts the image given by the display processing unit 25 of the processing unit 10 into image signals suitable for displaying on the display apparatus 5, and outputs the image signals. Thus, the game screen is displayed on the display apparatus 5.

Figure 2:
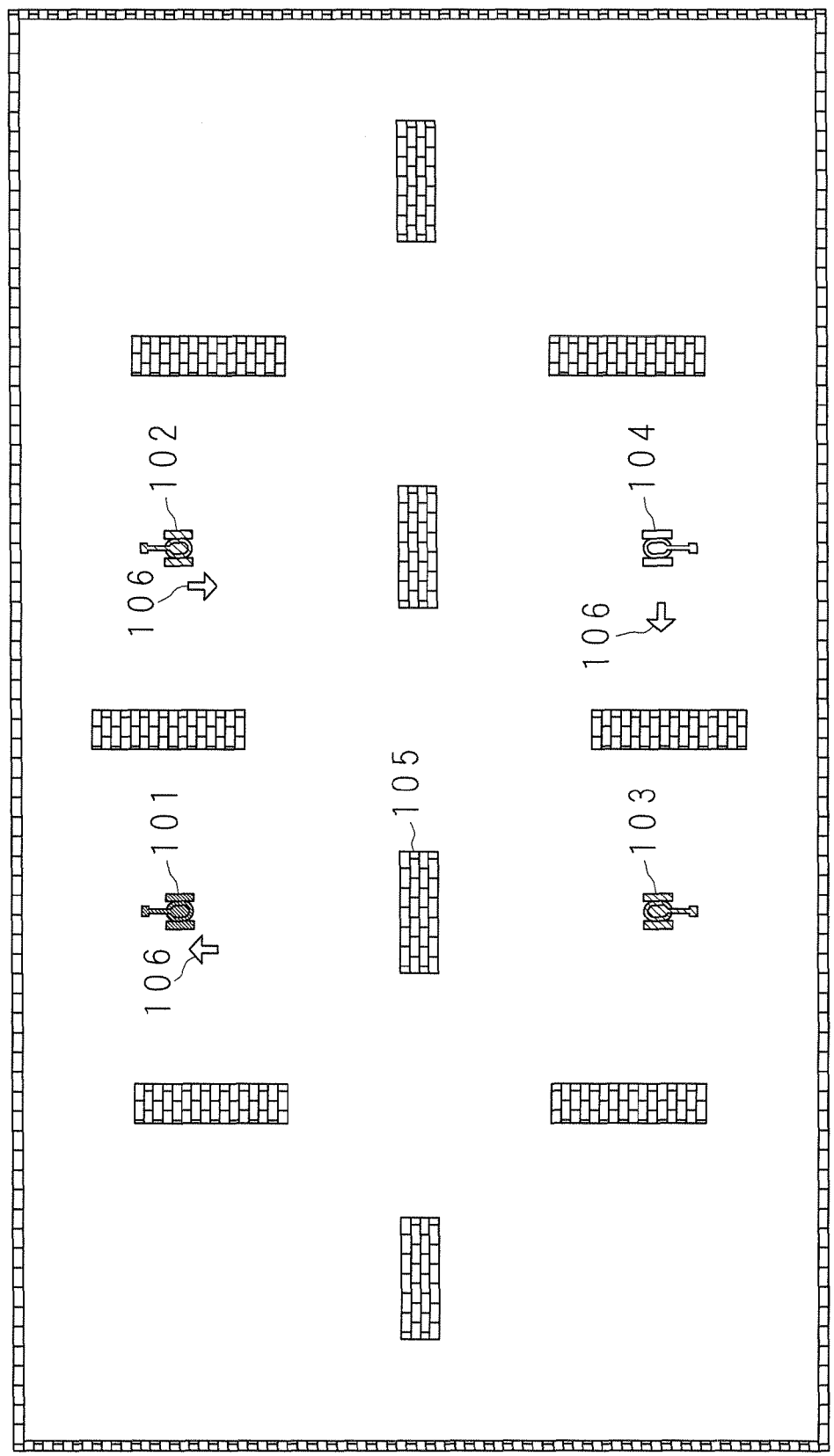
FIG. 2 shows an example non-limiting schematic view for representing a game screen displayed by a game program according to the present embodiment.
Figure 3:
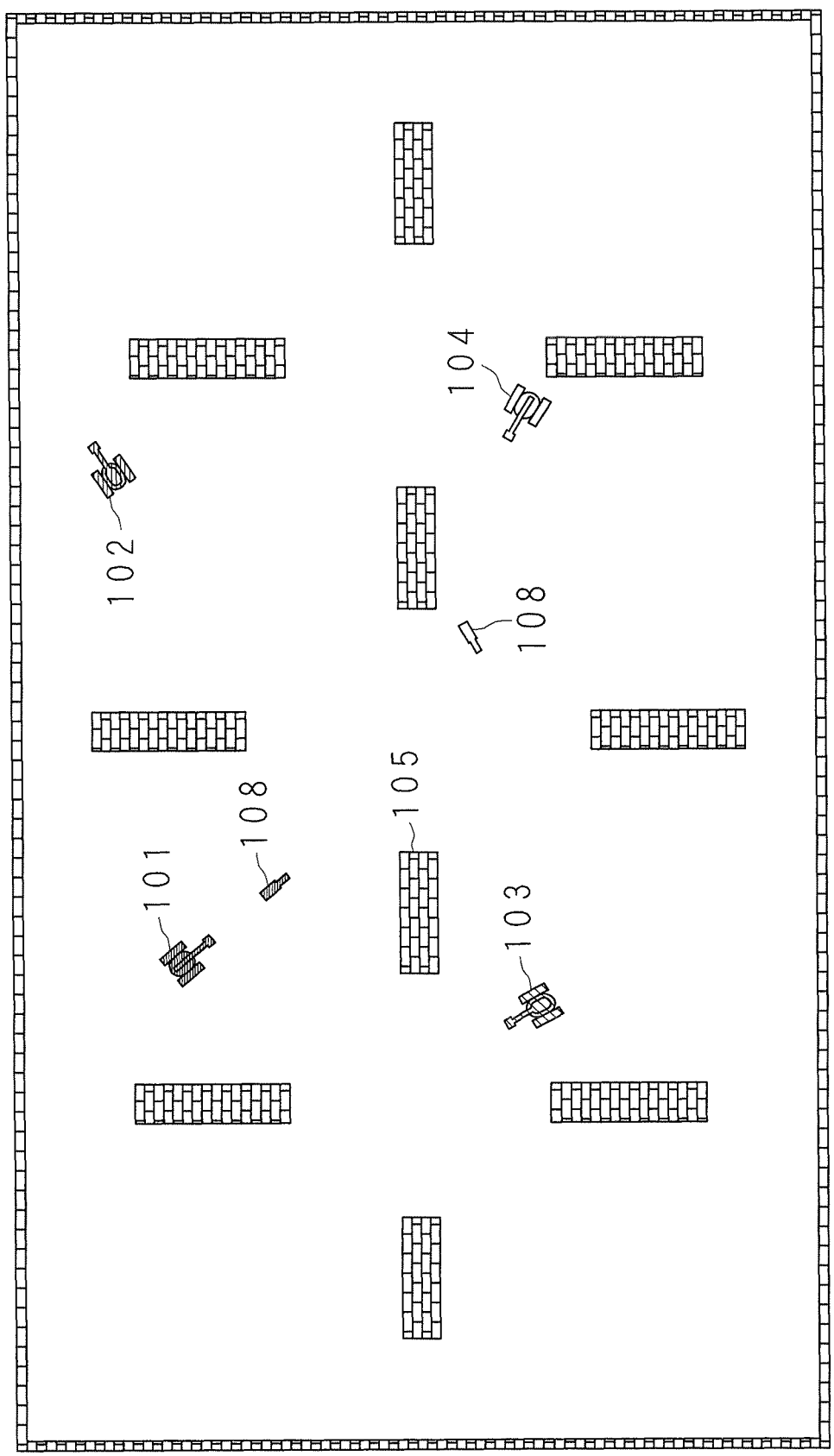
FIG. 3 shows an example non-limiting schematic view for representing a game screen displayed by a game program regarding the present embodiment.

Next, an example is explained about the game played with the game program 9 regarding the present embodiment. FIGS. 2 and 3 show examples non-limiting schematic view for representing game screens displayed by game program 9 regarding the present embodiment. In the game screens of the example, four combat vehicle objects 101-104 indicating player objects and plural obstacle objects 105 are arranged within a substantially rectangular field whose four sides are walled. Four combat vehicle objects 101-104 are differently colored, respectively. It should be noted that a different hatching in figures represents a different color for the combat vehicle objects 101-104. Thus, it is possible to distinguish each of combat vehicle objects 101-104 from each other on the game screen displayed by the display apparatus 5.

Four combat vehicle objects 101-104 are associated with four controllers 3 of the game apparatus 1, in one-to-one correspondence. In the game of this example, each of plural users utilizes one controller 3. Each user manipulates one associated combat vehicle object of the combat vehicle objects 101-104. The game screen shown in FIG. 2 represents a status before the game starts. In this status, the association between the combat vehicle objects 101-104 and controllers 3 is not shown. For example, the processing unit 10 of the game apparatus 1 in the game performs a random change of the association between the combat vehicle objects 101-104 and controllers 3 every time the game is played.

A user needs to recognize the user's combat vehicle object manipulated by the user's controller 3 among the combat vehicle objects 101-104. For example, when a manipulation is performed on a cross key arranged on the controller 3 in the status before the game is started, an arrow mark 106 corresponding to a direction of the manipulated cross key is shown near one of the combat vehicle objects 101-104, which is associated to the controller 3. Each user adequately utilizes its own controller 3 to perform the manipulation for instructing the direction based on the cross key. Through seeing the arrow mark 106 shown at that time near each of combat vehicle objects 101-104, the user can recognize its own combat vehicle to be manipulated among the combat vehicle objects 101-104.

After the game starts, each user manipulates one of the combat vehicle objects 101-104 and attacks other ones of the combat vehicle objects 101-104 which are manipulated by other users. The game screen shown in FIG. 3 represents a status after the game is started. Some combat vehicle objects 101-104 are attacking. For example, each user utilizes the cross key arranged on the controller 3 to perform movement manipulation of the combat vehicle objects 101-104, and utilizes the push button to perform the attack (cannonade) manipulation for the combat vehicle objects 101-104.

When the cannonade manipulation is performed, a cannonball 108 is launched by the combat vehicle object 101-104. The launched cannonball 108 travels in a predetermined direction. When the cannonball 108 makes contact with other combat vehicle objects 101-104, those combat vehicle objects 101-104 are destroyed and thus defeated in this game. When the cannonball 108 makes contact with an obstacle object 105, the travel direction of the cannonball 108 is reflected at the contact point of the obstacle object 105. Then, the cannonball 108 travels further in the reflected direction. After launched by the combat vehicle 101-104, the cannonball 108 continues traveling within the field until a predetermined time (e.g., 10 seconds) elapses. After the cannonball 108 are in contact with other combat vehicle object 101-104 or the predetermined time elapses, the cannonball 108 disappears.

Each of the combat vehicle objects 101-104 can launch one cannonball 108 at the initial stage. Each of the combat vehicle objects 101-104 cannot launch next cannonball 108 until the current cannonball 108 disappears, for example, due to the elapse of the predetermined time. The display processing unit 25 of the processing unit 10 shows in a distinguishable manner any of the combat vehicle objects 101-104 that can launch the cannonball 108 and any of the combat vehicle objects 101-104 that has launched the cannonball 108.

Figure 4A:
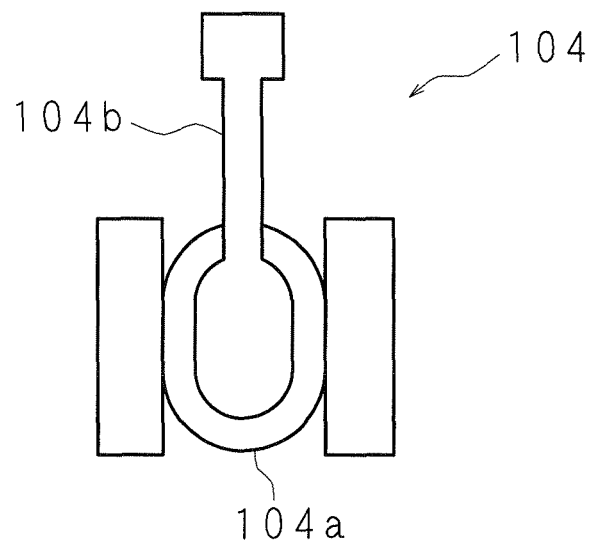
FIG. 4A shows an example non-limiting enlarged view for representing a combat vehicle object.
Figure 4B:
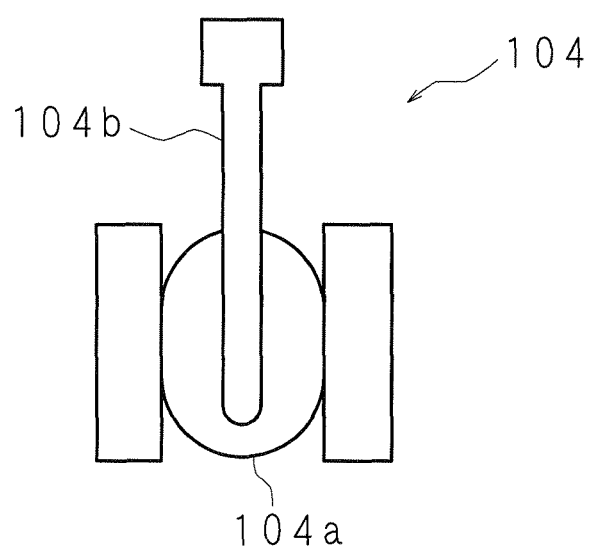
FIG. 4B shows an example non-limiting enlarged view for representing a combat vehicle object.

FIG. 4A and FIG. 4B show example non-limiting enlarged views for representing the combat vehicle object. It should be noted that each of FIGS. 4A and 4B shows one combat vehicle object 104 among the four combat vehicle objects 101-104. The other combat vehicle objects 101-103 are also configured similarly, although colored differently. The combat vehicle object 104 includes a main body portion 104a having caterpillars at both sides and a cannon barrel portion 104b arranged on the main body portion 104a. When in the status that the cannonball 108 can be launched, the combat vehicle object 104 is shown with an inflated root portion of the cannon barrel portion 104b as illustrated in FIG. 4A. The status in which the cannonball 108 can be launched is called as an attackable status. On the other hand, when the status that the cannonball 108 has been launched, the combat vehicle object 104 is shown with a contracted rod-like root portion of the cannon barrel portion 104b as illustrated in FIG. 4B. The status in which the cannonball 108 has been launched is called as a non-attackable status. Through the cannon barrel portion 104b of the combat vehicle object 104 shown by the display apparatus 5, the user can recognize whether or not the combat vehicle object 104 can launch the cannonball 108.

The user can manipulate each of the combat vehicle objects 101-104 to attack each other. The last one of the combat vehicle objects 101-104 which is not destroyed is treated as a winning object in this game.

In this example of the game, it is possible to make a temporal noncompetitive relationship between plural combat vehicle objects 101-104 after the game starts. The period after the game starts in the present embodiment means the period after it is in the status that each of the combat vehicle objects 101-104 can be operated for the movement, attack and the like. Additionally, the noncompetitive relationship is called as a team.

Figure 5:
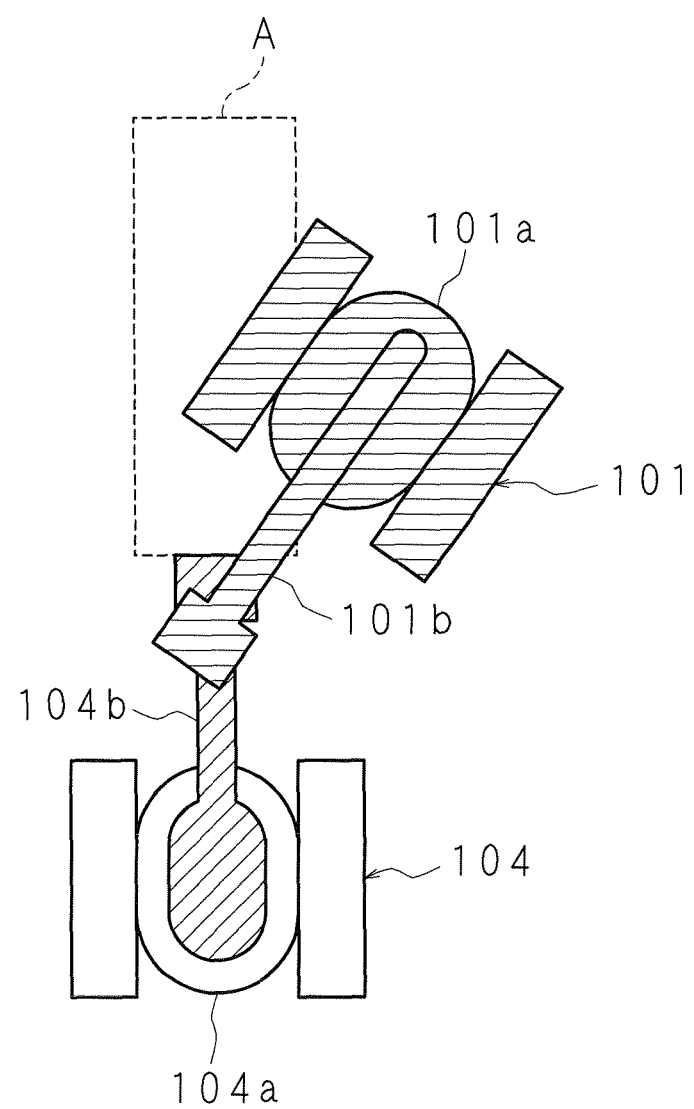
FIG. 5 shows an example non-limiting schematic view for explaining a satisfied condition of a team.

FIG. 5 shows an example non-limiting schematic view for explaining a satisfied condition of the team. In the game of this example, when a predetermined condition is satisfied and then two cannon barrel portions 101b, 104b of combat vehicle objects 101, 104 come in contact with each other, these two combat vehicle objects 101, 104 are set as one team. As for the predetermined condition, the team setup processing unit 23 of the processing unit 20 determines conditions regarding positions and directions of two combat vehicle objects 101, 104.

As for the predetermined condition, the team setup processing unit 23 determines whether one of combat vehicle objects 101, 104 exists in the attack range of the other one of combat vehicle objects 101, 104. In the example of FIG. 5, the area surrounded by the dashed lines indicates the attack range A of the combat vehicle object 104. It is determined that the cannonball 108 can hit (come in contact with) the combat vehicle object 101 when the combat vehicle object 104 launches the cannonball 108 in the attack range A shown in the figure. In addition, the team setup processing unit 23 compares attack directions or travel directions of two combat vehicle objects 101 and 104. As for the predetermined condition, the team setup processing unit 23 determines whether the angle formed by two vectors indicating respective attack directions is, for example, not less than 140° and not more than 220° (i.e., in a range of 180°±40°).

The team setup processing unit 23 sets the team, when these two conditions are satisfied and then two cannon barrel portions 101b, 104b of the combat vehicle objects 101, 104 make contact with each other. In other words, this predetermined condition is satisfied when two combat vehicle objects 101, 104 exist in positions where they can attack each other and then two combat vehicle objects 101, 104 make their own cannon barrel portions 101b, 104b contact with each other. Just before their own cannon barrel portions 101b, 104b are in contact with each other, each of combat vehicle objects 101, 104 can launch the cannonball 108 to destroy the other one. However, the combat vehicle object 101 shown in FIG. 5 cannot perform an attack because the combat vehicle object 101 is in the status where the cannonball 108 has been launched. The team setup processing unit 23 sets the team, regardless of whether or not the combat vehicle objects 101, 104 can launch the cannonball 108.

When the team is set in response to the contact of the cannon barrel portions 101b, 104b as shown in FIG. 5, the display processing unit 25 changes the color applied to one of the cannon barrel portion 101b, 104b to the color applied to the other one of the cannon barrel portion 101b, 104b. In FIG. 5, the color applied to the cannon barrel portion 104b of the combat vehicle object 104 is changed to the color applied to the cannon barrel portion 101b of the combat vehicle object 101. Based on the colors applied to the cannon barrel portions 101b, 104b, the user can recognize that the combat vehicle objects 101, 104 are set as the same team.

For example, when the combat vehicle objects 101, 102 are set as one team and then the combat vehicle objects 101, 104 satisfying the predetermined condition make their own cannon barrel portions 101b, 104b be in contact with each other, these three combat vehicle objects 101, 102, 104 are set as one team.

For example, two combat vehicle objects 101, 102 are set as the first team and the other two combat vehicle objects 103, 104 are set as the second team, the team setup processing unit 23 performs the following team setup. Particularly, when the combat vehicle objects 101, 104 make contact with each other, the team setup processing unit 2 selects one of the combat vehicle objects 101, 104 at random and changes the team of the selected object to be the other team. This results that, for example, three of combat vehicle objects 101, 102, 104 are set as the first team and only the combat vehicle object 103 is set as the second team. When the numbers of objects are equal in the teams including the contacted combat vehicle objects 101, 104, the team setup processing unit 23 moves any one of the combat vehicle objects 101, 104 into the other team, at random.

For example, when five combat vehicle objects including the combat vehicle object 101 are set as the first team and three combat vehicle objects including the combat vehicle object 104 are set as the second team, the team setup processing unit 23 performs the following team setup. Particularly, when the combat vehicle objects 101, 104 make contact with each other, the team setup processing unit 23 changes the team of the combat vehicle object 104 to be the first team. The team setup processing unit 23 moves the combat vehicle object 104, set as the second team having a smaller number of combat vehicle objects, into the first team having a larger number of combat vehicle objects.

For example, when three combat vehicle objects 101-103 are set as one team and the combat vehicle objects 101, 104 make contact with each other, the team setup processing unit 23 dissolves the team. The team setup processing unit 23 dissolves the team if all combat vehicle objects 101-104 not destroyed in the game will be set as one team.

When the team is set by the team setup processing unit 23, the processing unit 10 disables the combat vehicle objects 101-104 set as one team for attacking each other. For example, when the combat vehicle objects 101, 102 are set as one team and further the cannonball 108 launched by the combat vehicle object 101 come in contact with the combat vehicle object 102, the combat vehicle object 102 is not destroyed and the cannonball 108 passes over the combat vehicle object 102. This situation similarly occurs when the cannonball 108 launched by the combat vehicle object 102 makes contact with the combat vehicle object 101. Each of the combat vehicle objects 101-104 will never destroyed by its own launched cannonball 108, regardless of the team setup. In other words, the cannonball 108 launched by the combat vehicle objects 101-104 set as the same team with a specific combat vehicle object includes the cannonball 108 launched by the specific combat vehicle object.

Figure 6:
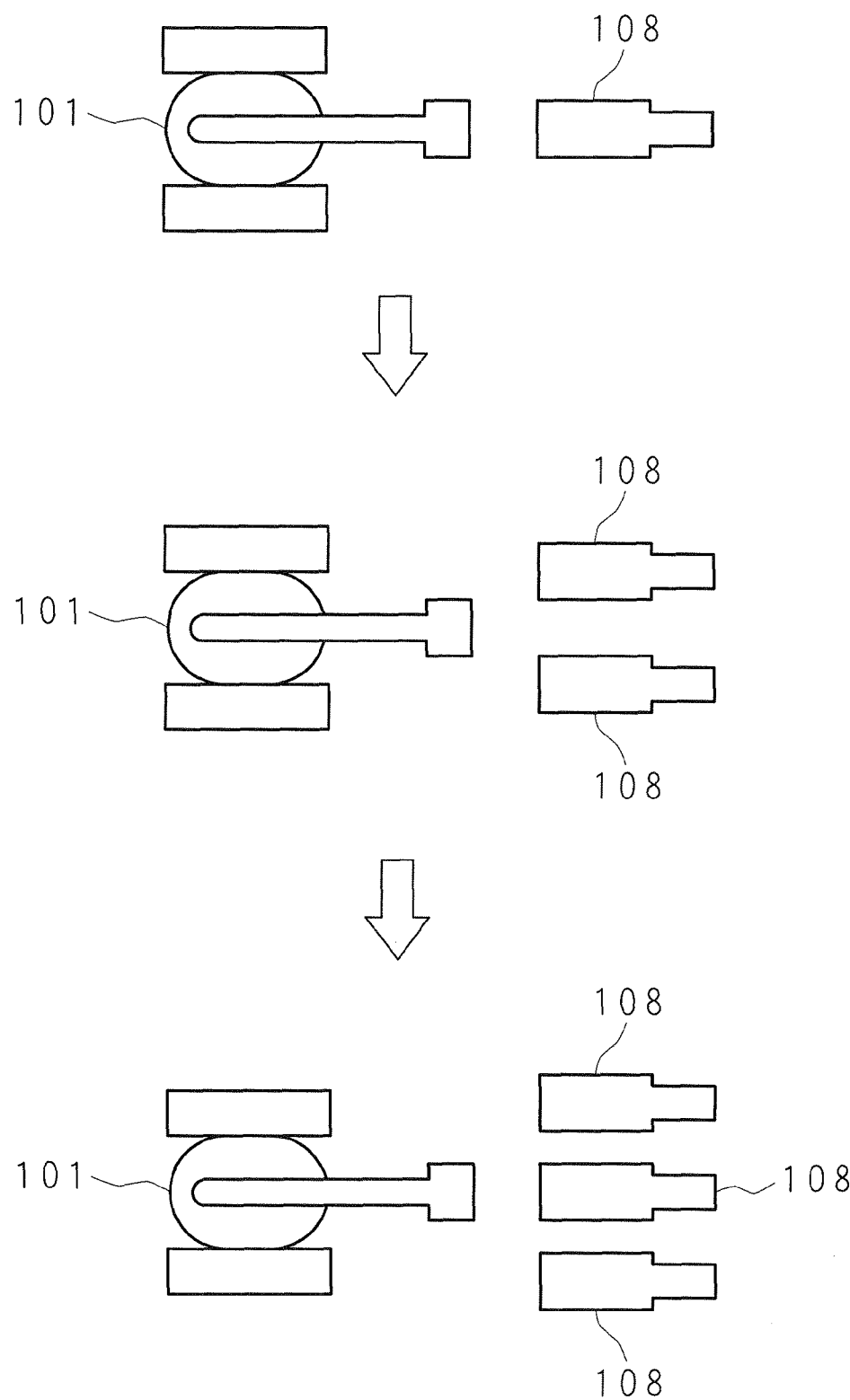
FIG. 6 shows an example non-limiting schematic view for explaining increase of attack power for the combat vehicle object.

When the team setup processing unit 23 sets the team, the processing unit 10 increases the attack power of the combat vehicle objects 101-104 included in the set team. FIG. 6 shows an example non-limiting schematic view for explaining increase of attack power for the combat vehicle objects 101-104. The top portion of FIG. 6 shows the initial status where the team is not set for the combat vehicle object 101 with the other combat vehicle objects 102-104. When the user utilizes the controller 3 for performing the attacking manipulation in this status, the combat vehicle object 101 can launch one cannonball 108. When the team is set for combat vehicle object 101 with another combat vehicle object 102 and thus the team includes two combat vehicle objects 101, 102, the number of cannonballs 108 is increased and thus the combat vehicle object 101 can launch two cannonballs 108 (see middle portion of FIG. 6). When the team includes three combat vehicle objects 101-103, the number of cannonballs 108 is increased and thus the combat vehicle object 101 can launch three cannonballs 108 (see bottom portion of FIG. 6).

The processing unit 10 increases the attack power of combat vehicle objects 101-104 included in the team, based on the number of combat vehicle objects 101-104 included in the team. It should be noted that the method for increasing the attack power is not limited to the number increase of the cannonballs 108. For example, it may alternatively change the size of the cannonball 108 to be larger or increase the strength of the cannonball 108.

The processing unit 10 in the present embodiment does not decrease the attack power of the combat vehicle objects 101-104 even when the number of the combat vehicle objects 101-104 included in the team is decreased and when the set team is dissolved. Therefore, it is possible to prevent the user from feeling less excited in the game even when the number of not-destroyed combat vehicle objects 101-104 is decreased at the late time of the game. However, the processing unit 10 may be alternatively configured to decrease the attack power of the combat vehicle objects 101-104.

In the game of the present embodiment, the user utilizes the controller 3 to perform manipulations, such as the moving manipulation and attacking manipulation of the combat vehicle objects 101-104. Each user can attack other combat vehicle objects 101-104, while setting the team with other combat vehicle objects 101-104. Thus, the game runs. Eventually, the winning object is a remaining one combat vehicle object which is not destroyed among the combat vehicle objects 101-104.

Figure 7:
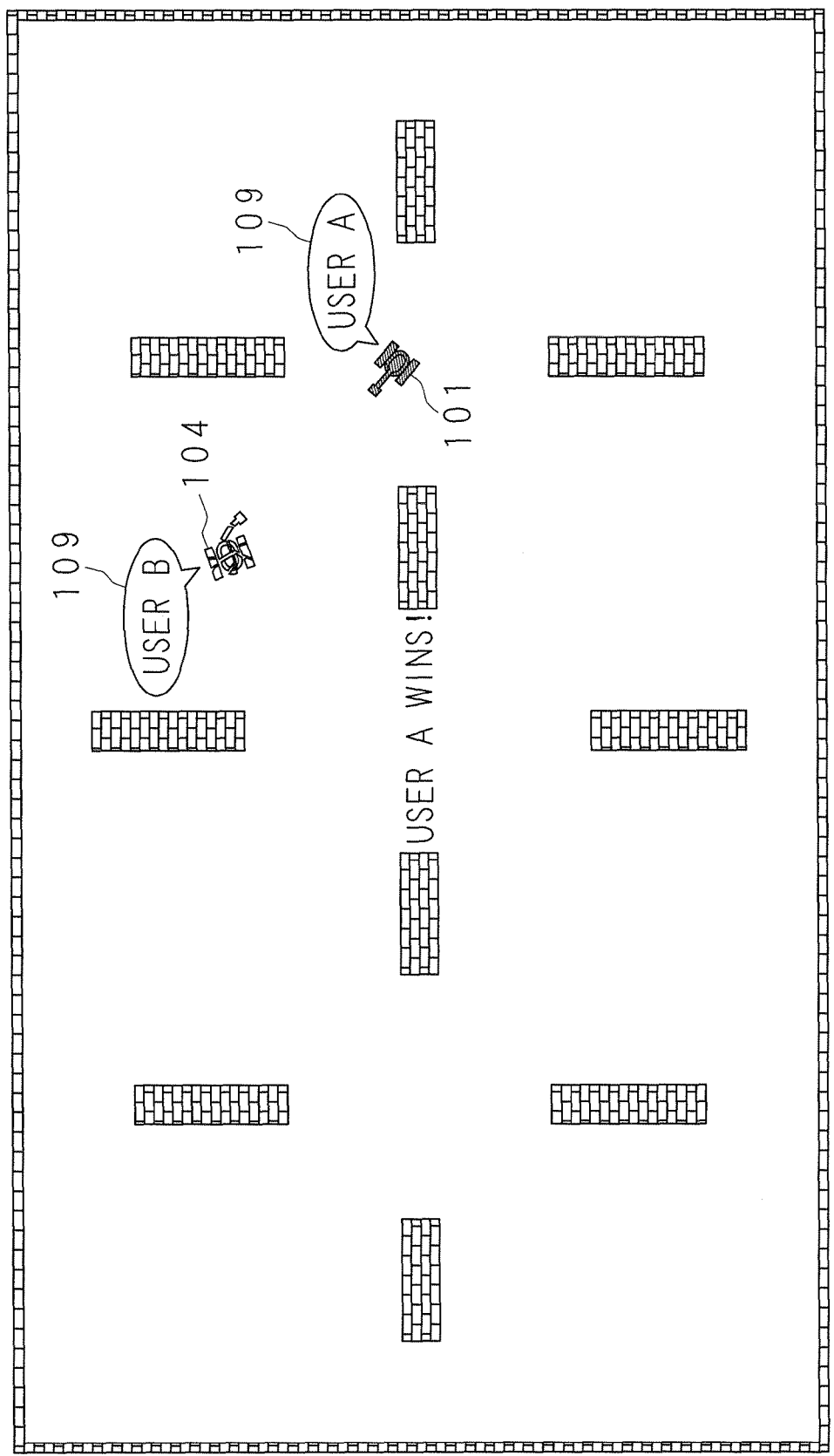
FIG. 7 shows an example non-limiting schematic view for representing a game screen after win decision.

FIG. 7 shows an example nonlimiting schematic view for representing the game screen after a win decision. The example in the figure shows a status where the combat vehicle object 101 eventually wins. When the game determination processing unit 24 of the processing unit 10 determines that the combat vehicle object 101 has won, the display processing unit 25 shows a message at the center of the game screen for notifying the win decision. The message "user A wins!" is shown in the example of the figure. The explanation is based on the assumption that the combat vehicle 101 is manipulated by the user A. After the win decision, the display processing unit 25 shows recognizing information 109 near the combat vehicle object 101 which is for recognizing the user who manipulates the combat vehicle object 101. In the example of the figure, the display processing unit 25 shows the user name, i.e., "user A", within a substantially circular balloon as the recognizing information 109. The user name shown as the recognizing information 109 is registered before the game starts. The information shown as the recognizing information 109 is not limited to the user name. For example, it may be an image such as a user's picture or user's portrait, or number applied to the controller 3 that is associated with the winning combat vehicle objects 101-104.

When the game determination processing unit 24 determines that the combat vehicle objects 101-104 are destroyed and defeated, the display processing unit 25 similarly shows the recognizing information 109 that indicates the user regarding the defeated combat vehicle objects 101-104. The example in the figure shows the status where the combat vehicle object 104 is destroyed and defeated. The defeated combat vehicle object 104 determined by the game determination processing unit 24 is shown by an image resembling a destroyed combat vehicle. The display processing unit 25 shows the recognizing information 109 near the combat vehicle object 104 which is for recognizing the user who manipulates the defeated combat vehicle object 104.

The display processing unit 25 shows the recognizing information 109 for the defeated combat vehicle objects, not only at the time when the winning object is decided in the game. The display processing unit 25 shows the recognizing information 109 every time when it is decided that each of the combat vehicle objects 101-104 is defeated. The display processing unit 25 continues showing the recognizing information 109 during a predetermined time (e.g., 30 seconds) after the defeat decision, and then stops showing the defeated combat vehicle objects 101-104 and recognizing information 109.

Figure 8:
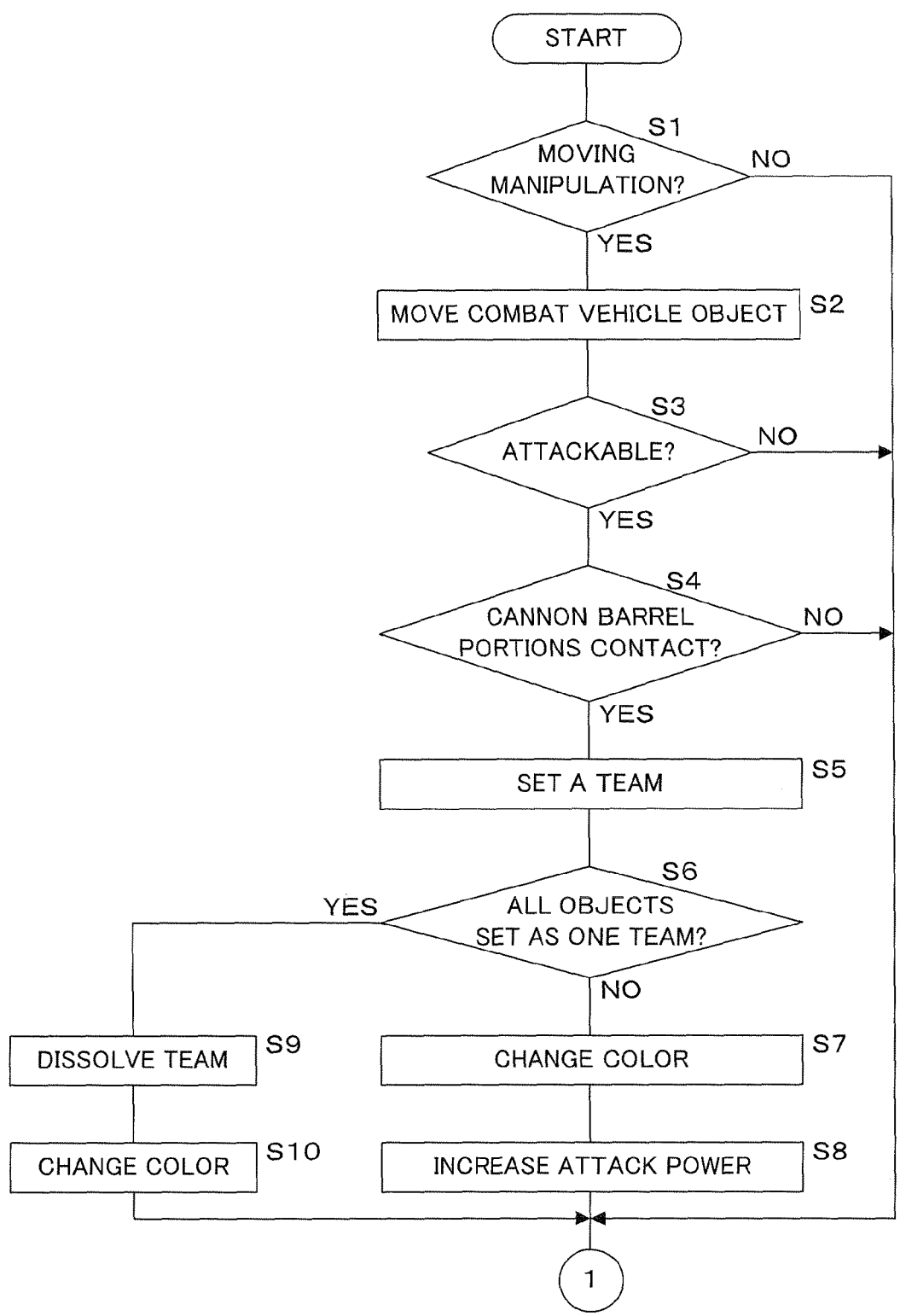
FIG. 8 shows an example non-limiting flowchart for representing a procedure performed by a processing unit based on an executed game program.
Figure 9:
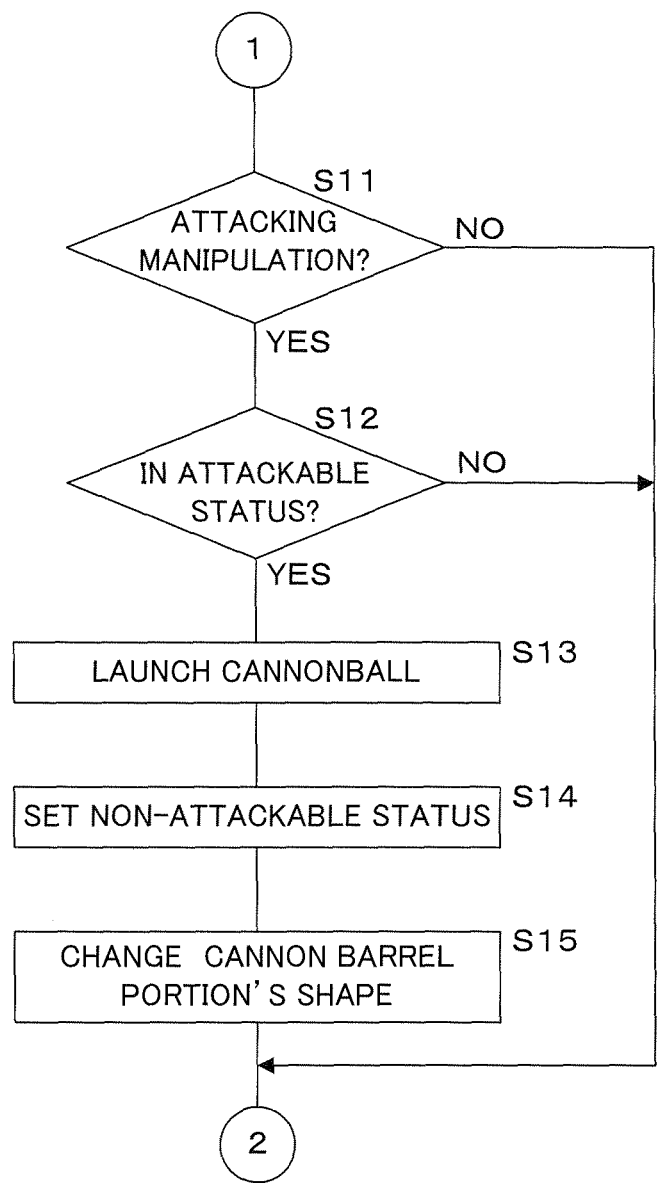
FIG. 9 shows an example non-limiting flowchart for representing a procedure performed by the processing unit based on an executed game program.
Figure 10:
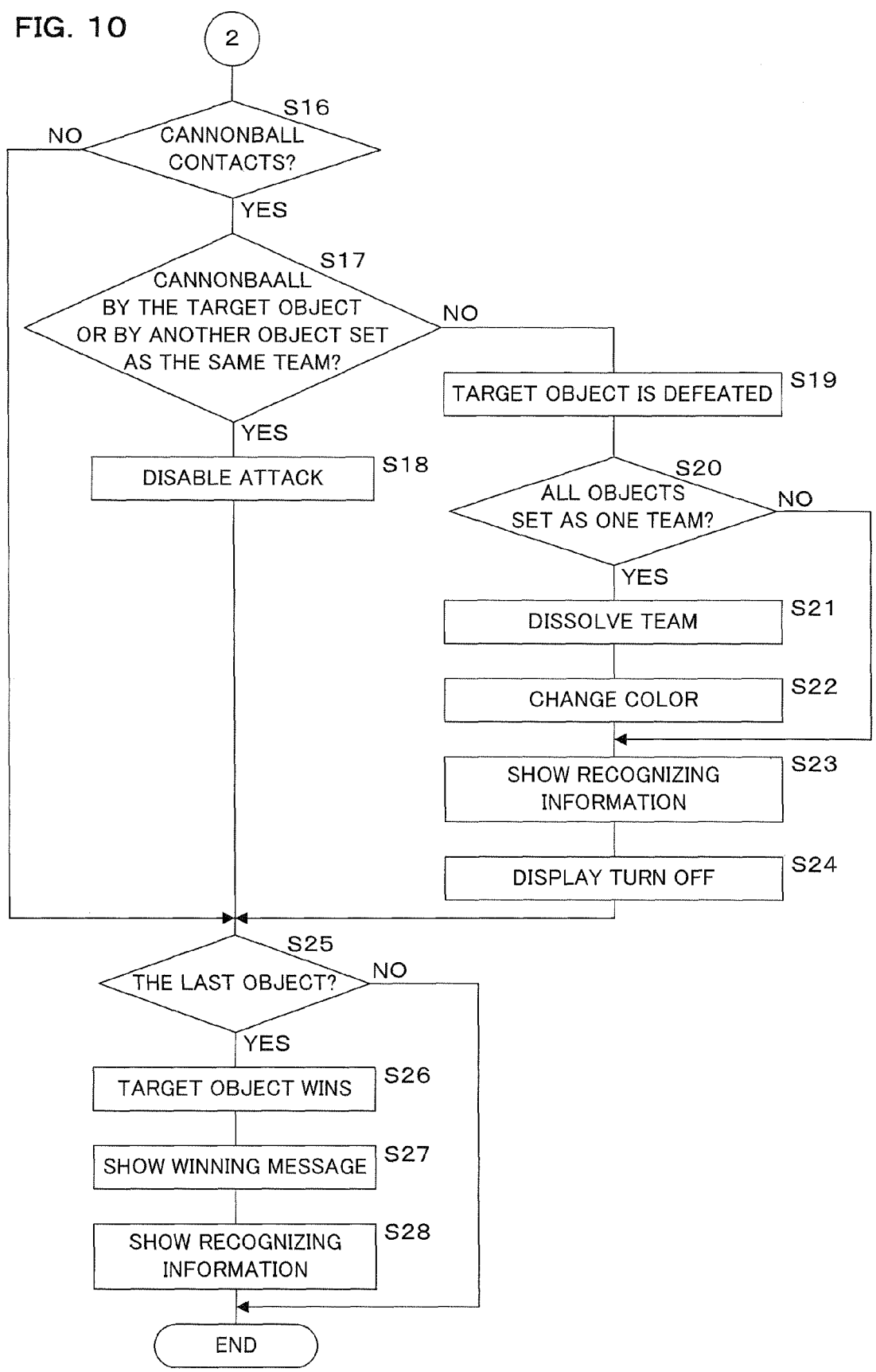
FIG. 10 shows an example non-limiting flowchart for representing a procedure performed by the processing unit based on an executed game program.

FIGS. 8-10 show example non-limiting flowcharts for representing a procedure performed by the processing unit 10 based on the executed game program 9. It should be noted that the procedure shown in figures is performed for each one of the combat vehicle objects 101-104 existing in the game. The processing unit 10 of the game machine 1 utilizes the input manipulation accepting unit 21 to determine whether the moving manipulation for moving the combat vehicle objects 101-104 is accepted by the controller 3 or not (step S1). When the moving manipulation is not accepted (S1: NO), the processing unit 10 proceeds the procedure to the step S11. When the moving manipulation is accepted (S1: YES), the object control processing unit 22 of the processing unit 10 moves a target one of the combat vehicle objects 101-104 in a field of the game, based on the accepted moving manipulation (step S2).

The team setup processing unit 23 of the processing unit 10 determines whether or not the target one of the combat vehicle objects 101-104 and other ones of the combat vehicle objects 101-104 are in a status attackable to each other (step S3). For determining at the step S3, the team setup processing unit 23 determines whether another one of the combat vehicle objects 101-104 exists near the target one of the combat vehicle objects 101-104, and if it exists, determines whether the predetermined condition is satisfied for the position and direction of said existing another one of the combat vehicle objects 101-104. When having determined that the status is not attackable (S3: NO), the processing unit 10 proceeds the procedure to the step S11.

When having determined that the status is attackable (S3: YES), the team setup processing unit 23 further determines whether the cannon barrel portion included by the target one of the combat vehicle objects 101-104 and the cannon barrel portion included by the adjacent another one of the combat vehicle objects 101-104 make contact with each other (step S4). When these cannon barrel portions do not make contact (S4: NO), the processing unit 10 proceeds the procedure to the step S11. When having determined that these cannon barrel portions make contact with each other (S4: YES), the team setup processing unit 23 sets two combat vehicle objects 101 whose cannon barrel portions make contact with each other as one team (step S5).

The team setup processing unit 23 determines whether or not all of the combat vehicle objects 101-104 not destroyed in the game are set as one team (step S6). When all of the combat vehicle objects 101-104 are not set as one team (S6: NO), the processing unit 10 changes the color applied to any one of cannon barrel portions, included in two combat vehicle objects 101-104 set as the same team, to the color applied to the other one of cannon barrel portions (step S7). In addition, the processing unit 10 increases the attack power of the combat vehicle objects 101-104 set as one team (step S8), and proceeds the procedure to the step S11. When all of the combat vehicle objects 101-104 are set as one team (S6: YES), the processing unit 10 utilizes the team setup processing unit 23 to dissolve the team (step S9). In addition, the processing unit 10 changes the color applied to the cannon barrel portion included in each of the combat vehicle objects 101-104 to be an individual color (step S10), and proceeds the procedure to the step S11.

The processing unit 10 utilizes the input manipulation accepting unit 21 to determine whether or not the attacking manipulation for the combat vehicle objects 101-104 is accepted by the controller 3 (step S11). When the attacking manipulation is not accepted (S11: NO), the processing unit 10 proceeds the procedure to the step S16. When the attacking manipulation is accepted (S11: YES), the processing unit 10 further determines whether or not the combat vehicle objects 101-104 are in the attackable status (step S12). When having determined that the combat vehicle objects 101-104 are not in the attackable status (S12: NO), the processing unit 10 proceeds the procedure to the step S16.

When the processing unit 10 has determined that the combat vehicle objects 101-104 are in the attackable status (S12: YES), the object control processing unit 22 of the processing unit 10 launches the cannonballs 108 of the number corresponding to the set attack power (step S13). In addition, the object control processing unit 22 sets the non-attackable status for the target one of the combat vehicle objects 101-104 (step S14). The processing unit 10 makes the display processing unit 25 show the target one of the combat vehicle objects 101-104 whose cannon barrel portion's shape is changed (step S15), and the processing unit 10 proceeds the procedure to the step S16. Although not shown in the flowcharts, the object control processing unit 22 sets the attackable status for the target one of the combat vehicle objects 101-104 after the non-attackable status is set for the target and then a predetermined time elapses. In addition, the display processing unit 25 restores the shape of the cannon barrel portion included in the target one of the combat vehicle objects 101-104 and then shows the target.

The game determination processing unit 24 of the processing unit 10 determines whether or not a cannonball 108 launched by another one of the combat vehicle objects 101-104 makes contact with the target one of the combat vehicle objects 101-104 (step S16). When the cannonball 108 does not make contact (S16: NO), the processing unit 10 proceeds the procedure to the step S25. When the cannonball 108 makes contact (S16: YES), the game determination processing unit 24 further determines whether the contacting cannonball 108 is launched by the target one or by another one of combat vehicle objects 101-104 set as the same team with the target (step S17). When having determined that the contacting cannonball 108 is launched by the target one or by another one of combat vehicle objects 101-104 set as the same team with the target (S17: YES), the game determination processing unit 24 disables the attack of that cannonball 108 (step S18) and proceeds the procedure to the step S25.

When having determined that the contacting cannonball 108 is not launched by the target and is not launched by other of combat vehicle objects 101-104 set as the same team with the target (S17: NO), the game determination processing unit 24 decides that the target one of the combat vehicle objects 101-104 is defeated (step S19). The team setup processing unit 23 of the processing unit 10 determines whether or not all of the combat vehicle objects 101-104 not yet decided as defeated are set as one team (step S20). When all of the combat vehicle objects 101-104 having no decision about the defeat are not set as one team (S20: NO), the processing unit 10 proceeds the procedure to the step S23.

When all of the combat vehicle objects 101-104 not yet decided as defeated are set as one team (S20: YES), the processing unit 10 utilizes the team setup processing unit 23 to dissolve the team (step S21). In addition, the processing unit 10 changes the color applied to the cannon barrel portion included in each of the combat vehicle objects 101-104 to be an individual color (step S22), and proceeds the procedure to the step S23.

The display processing unit 25 of the processing unit 10 shows the recognizing information 109 regarding the defeated combat vehicle objects 101-104 (step S23). The display processing unit 25 turns off the shown recognizing information 109 after a predetermined time elapses (step S24), and then proceeds the procedure to the step S25.

The game determination processing unit 24 of the processing unit 10 determines whether the target one of the combat vehicle objects 101-104 is the last one in the game or not (step S25). When the target is not the last one (S25: NO), the processing unit 10 ends the procedure. When the target is the last one (S25: YES), the game determination processing unit 24 decides that the target one of the combat vehicle objects 101-104 wins (step S26). The display processing unit 25 of the processing unit 10 shows the message notifying of the winning combat vehicle objects 101-104 (step S27). In addition, the display processing unit 25 shows the recognizing information 109 regarding the winning combat vehicle objects 101-104 (step S28), and then ends the procedure.

It should be noted that the processing unit 10 repeatedly performs the above procedure of the steps S1-S28 from the game start to the decision time of the winning object.

The game apparatus 1 described above performs processing regarding the game in which plural combat vehicle objects 101-104 compete, in accordance with the input manipulation accepted by the controller 3 by the processing unit 10 executing the game program 9. The term "compete" in the present embodiment means that plural combat vehicle objects 101-105 attack each other. In the processing unit 10 of the game apparatus 1, the object control processing unit 22 controls the operation for the combat vehicle objects 101-104, based on the input manipulation, such as moving and attacking accepted by the input manipulation accepting unit 21. The processing unit 10 makes the team setup processing unit 23 set the noncompetitive relationship for the competition in that game, when a predetermined operation is performed, such as an operation making the cannon barrel portions included in two of the combat vehicle objects 101-104 make contact with each other. The term "noncompetitive relationship" in the present embodiment means that plural combat vehicle objects 101-104 are set as one team.

Therefore, the user can make one of the combat vehicle objects 101-104 manipulated by the user perform a predetermined operation after the game starts, and thus can set the team with another one of the combat vehicle objects 101-104. Hence, it is not required for the user to decide and/or talk about the team setup before the game starts.

The team setup processing unit 23 of the processing unit 10 determines whether or not two of the combat vehicle objects 101-104 are at positions and in directions which allow the attack. When both two of the combat vehicle objects 101-104 exist at the positions and in the directions which allow the attack and then the predetermined operation is performed for the two of the combat vehicle objects 101-104, the team setup processing unit 23 sets the team. When the two of the combat vehicle objects 101-104 exist at the positions and in the directions which allow the attack but the predetermined operation is not performed, these two of the combat vehicle objects 101-104 can attack each other.

Therefore, the user can enjoy tactics for selecting the attack or team setup between two of the combat vehicle objects 101-104.

It should be noted that the predetermined operation for the team setup is not limited to the contact of cannon barrel portions included in the combat vehicle objects 101-104. For example, the team may be set when two of the combat vehicle objects 101-104 come close to each other within a predetermined range, regardless of the cannon barrel portions' contact. The predetermined range for the team setup at that time may be narrower than the attackable range for each of the combat vehicle objects 101-104. Alternatively, the team may be set when two of the combat vehicle objects 101-104 make contact with each other, regardless of the cannon barrel portions. Alternatively, the team may be set when the cannon barrel portions are in contact with each other, regardless of the positions and directions of said two of the combat vehicle objects 101-104. Additionally, in the case that the object manipulated by the user is not a combat vehicle but a human type character having a weapon, such as a sword, the team may be set when the weapon objects held by the human type character objects make contact with each other, not when the human type character objects make contact with each other.

The processing unit 10 disables the attack performed between the combat vehicle objects 101-104 set as one team by the team setup processing unit 23. In addition, the processing unit 10 increases the attack power of combat vehicle objects 101-104, based on the number of the combat vehicle objects 101-104 included in the team. Therefore, the operation for setting the team by plural combat vehicle objects 101-104 lead to an advantage.

After the combat vehicle objects 101-104 launch the cannonballs 108 based on the attacking manipulation, the processing unit 10 sets these combat vehicle objects 101-104 as the non-attackable status until a predetermined time elapses. The display processing unit 25 of the processing unit 10 shows the combat vehicle objects 101-104 in a manner recognizable whether the attack is possible or impossible. Therefore, the user can move one of the combat vehicle objects 101-104 set in non-attackable status closer to another one of the combat vehicle objects 101-104, for example, during the predetermined time after the attack, for indicating the intention of no attack, and urging to set the team with said another one of the combat vehicle objects 101-104.

When the predetermined operation is performed between one of the plural combat vehicle objects 101-104 for which one team is set and another one of the combat vehicle objects 101-104 for which the team is not set, the team setup processing unit 23 of the processing unit 10 includes the above-described another one of the combat vehicle objects 101-104 belong in the team. In addition, when the predetermined operation is performed between one of the combat vehicle objects 101-104 included in the first team and one of the combat vehicle objects 101-104 included in the second team, the team setup processing unit 23 brings any one of these two among the combat vehicle objects 101-104 into the other team. When the number of the combat vehicle objects 101-104 included in the first team is equal to the number of the combat vehicle objects 101-104 included in the second team at that time, the team setup processing unit 23 randomly selects one of the combat vehicle objects 101-104 to be brought into the other team in response to the predetermined operation. When the numbers are not equal, the team setup processing unit 23 brings one of the combat vehicle objects 101-104, included in the team having a smaller number of objects, into the other team having a larger number of objects.

This allows a larger number of combat vehicle objects 101-104 to set up teams and attack each other.

When the predetermined dissolution condition is satisfied, the team setup processing unit 23 of the processing unit 10 dissolves the team. When all combat vehicle objects 101-104 in the game are set as one team, the team setup processing unit 23 dissolves the team. However, it should be noted that the dissolution condition for the team is not limited to the above explanation. For example, when a predetermined time elapses after a team is initially set, the team setup processing unit 23 may dissolve the team. For example, when an item for resolving the team appears in the game and then the combat vehicle objects 101-104 get the item, the team setup processing unit 23 may dissolve the team.

The team dissolution described above can make a team temporal, and it is possible to implement the game in which eventually all combat vehicle objects 101-104 compete against each other.

The game determination processing unit 24 of the processing unit 10 determines the success or fail of the attack, based on whether the cannonball 108 launched by one of the combat vehicle objects 101-104 make contact with another one of the combat vehicle objects 101-104. When having determined that the attack succeeds, the game determination processing unit 24 determines that said another one of the combat vehicle objects 101-104 with which the cannonball 108 is in contact is defeated. When the number of the not defeated combat vehicle objects 101-104 becomes one, the game determination processing unit 24 determines this one of combat vehicle objects 101-104 as the winning object.

The game apparatus 1 includes plural controllers 3, and the input manipulation accepting unit 21 of the processing unit 10 accepts the input manipulations from plural users. The object control processing unit 22 controls the operation for the plural combat vehicle objects 101-104 based on the accepted input manipulation. The display processing unit 25 of the processing unit 10 displays the game screen in such a manner that the user who manipulates each of the combat vehicle objects 101-104 cannot be recognized. After the win or defeat is decided for the game, the display processing unit 25 shows the recognizing information 109 for recognizing the user who manipulates each of the combat vehicle objects 101-104. Therefore, each user can attack or set the team, without taking into consideration of the user who manipulates each of the combat vehicle objects 101-104.

Although the present embodiment is explained about the game played by executing the game program 9 in which plural combat vehicle objects 101-104 attack each other, the present technology is not limited to the explanation. Objects, such as an airplane, ship, robot, human or animal, may attack each other in the game. Plural objects in the game may perform competition, such as a race or sports, instead of the attack.

Although the present embodiment is explained about the game that four combat vehicle objects 101-104 attack each other, the present technology is not limited to the explanation. In the game, three or less combat vehicle objects 101-104 may attack each other, or five or more combat vehicle objects 101-104 may attack each other. The number of the combat vehicle objects 101-104 in the game can be increased and decreased adequately, in accordance with the number of users joining in the game, the number of the controllers 3 included in the game apparatus 1, or the like. It may be configured that the processing unit 10 of the game apparatus 1 operates a part of plural combat vehicle objects 101-104, instead of the user utilizing the controller 3 to manipulate all of the plural combat vehicle objects 101-104.

Although the present embodiment is explained that the team setup processing unit 23 sets a team when the predetermined operation is performed between two of the combat vehicle objects 101-104, the present technology is not limited to the explanation. For example, it may be configured that the team is set when the predetermined operation is performed between three or more of the combat vehicle objects 101-104. The predetermined condition described above for setting the team and the dissolution condition described above for dissolving the team are not limited to the above but may be other various conditions.

Although the present embodiment is explained that the processing unit 10 of the game apparatus 1 executes the game program 9 to implement the elements from the input manipulation accepting unit 21 to display processing unit 25 in the processing unit 10 as software function blocks, the present technology is not limited to the explanation. For example, partial functions of the elements from the input manipulation accepting unit 21 to display processing unit 25 may be implemented as the function of OS (Operating System). Although the present embodiment is explained about the configuration that the game apparatus 1 performs wireless information transmission with the controller 3, the present technology is not limited to the explanation. The game apparatus 1 and controller 3 may be connected with a wire. Although the present embodiment is explained about the configuration that the game apparatus 1 is stationary, the present technology is not limited to the explanation. The game apparatus may be portable. The game apparatus 1 may not be a game console. The game apparatus 1 may be some information processor that can execute the game program 9, such as a PC (Personal Computer) or smartphone.

Although the present embodiment is explained about the configuration that one game apparatus 1 intensively performs processing regarding the game, the present technology is not limited to the explanation. For example, it is possible to utilize a game system where plural game apparatuses communicate with the server device through the network. In that game system, for example, each game apparatus accepts user's manipulation, and the contents of the accepted manipulation are sent to the server device. The server device performs the procedure shown in FIGS. 8-10, in accordance with the manipulation information sent from the plural game apparatuses. Then, the server device sends the results of the procedure to each game apparatus. Each game apparatus performs the display processing of the game screen, based on the result of the procedure sent from the server device. For example, it may be configured that the input manipulation accepting unit 21 and display processing unit 25 are applied to each game apparatus and the object control processing unit 22, team setup processing unit 23 and game determination processing unit 24 are applied to the server device. It should be noted that the example configuration described above does not limit the functions distributed to each game apparatus and server device.

The network configuration for making plural game apparatus play the game through the network is not limited to the above configuration utilizing the server device. For example, it may be configured that one of plural game apparatuses performs the procedure performed by the server device described above. For example, it may be configured that each game apparatus communicates with other game apparatuses to exchange information, and each apparatus performs the processing regarding the game based on the obtained information.

It may be configured that not all of plural game apparatuses performing the game through the network are the same type. For example, several types of game apparatuses may be contained, such as a stationary game apparatus, portable game apparatus, PC with installed game program, and smartphone with installed game application.

Alternative Embodiment

Figure 11:
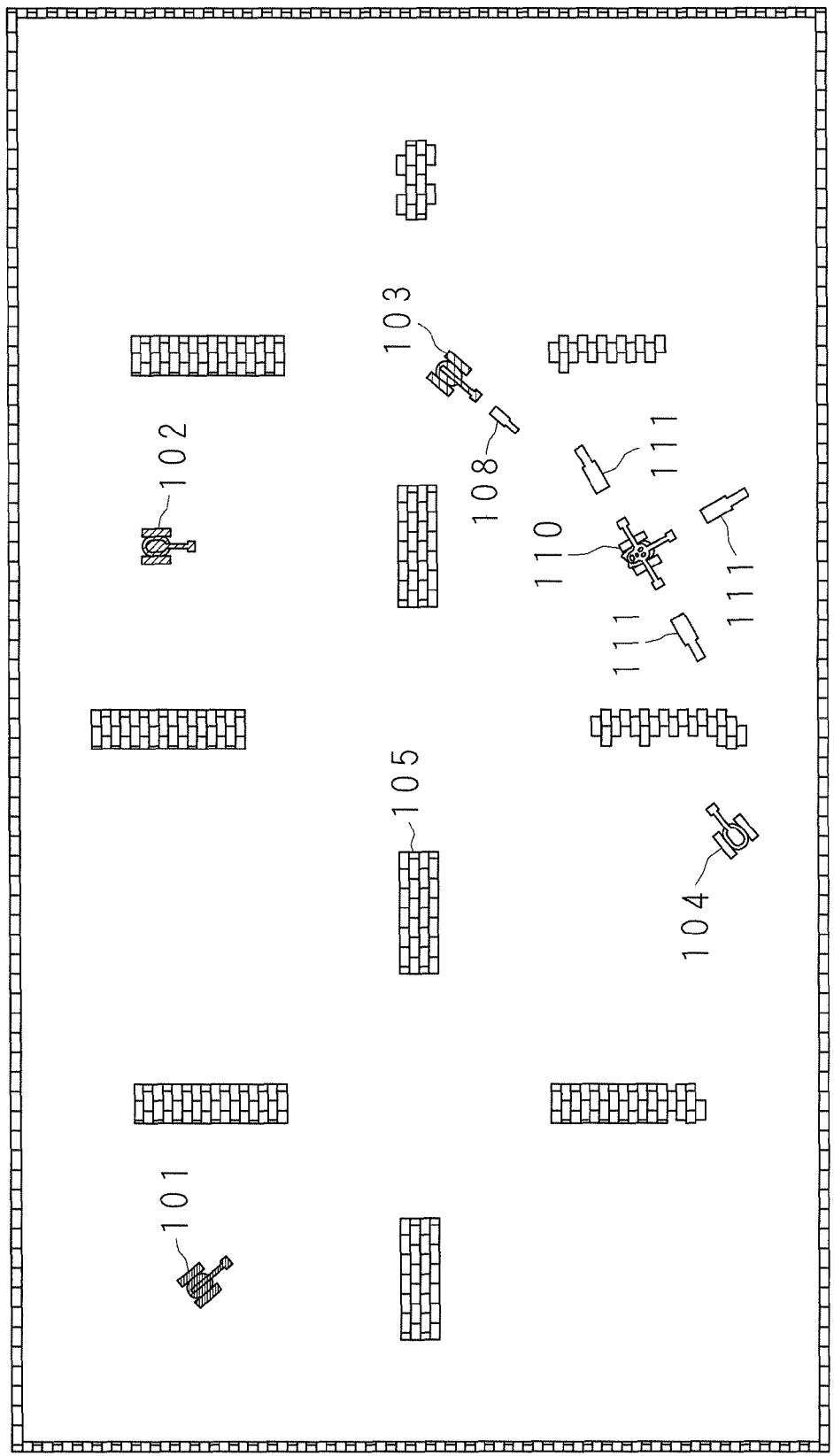
FIG. 11 shows an example non-limiting schematic view for representing a game screen according to an alternative embodiment.
Figure 12A:
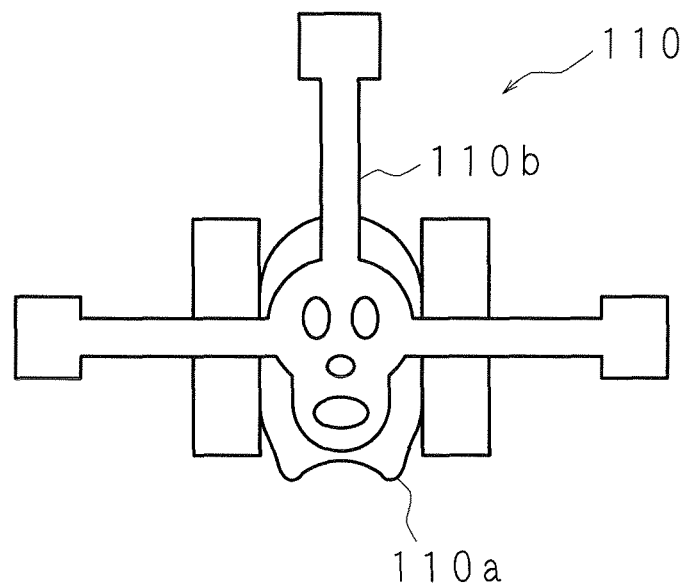
FIG. 12A shows an example non-limiting schematic view for representing an appearance of an object utilized in a game regarding the alternative embodiment.
Figure 12B:
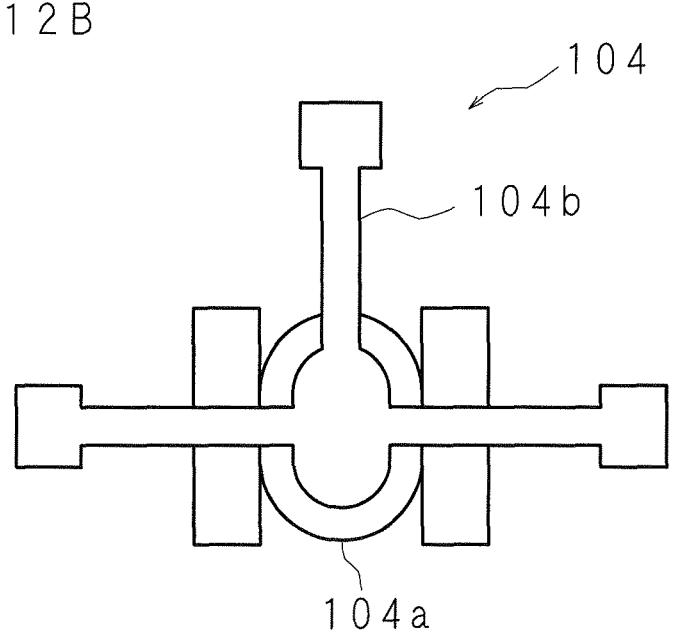
FIG. 12B shows an example non-limiting schematic view for representing an appearance of an object utilized in the game regarding the alternative embodiment.

FIG. 11 shows an example non-limiting schematic view for representing a game screen regarding an alternative embodiment. FIGS. 12A and 12B show example non-limiting schematic views for representing an appearance of an object utilized in a game regarding the alternative embodiment. The game program 9 regarding the alternative embodiment is executed by the processing unit 10 of the game apparatus 1 for the game that develops not only the combat vehicle objects 101-104 manipulated by the user but also an enemy object 110 whose operation, such as move and attack, are manipulated by the processing unit 10. The enemy object 110 is a combat vehicle object opposing all of the combat vehicle objects 101-104. The shown appearance of the enemy object 110 is different from the shown appearance of the combat vehicle objects 101-104. The enemy object 110 is set to have larger attack power than the combat vehicle objects 101-104.

As shown in FIG. 12A, the enemy object 110 includes a main body portion 110a whose both sides have caterpillars, and a canon barrel portion 110b that is arranged on the main body portion 110a. The cannon barrel portion 110b includes three cannon barrels directed in the front, left and right directions. The enemy object 110 can launch three cannonballs 111 in the front, left and right directions, simultaneously. The cannonball 111 launched by the enemy object 110 is bigger than the cannonball 108 of the combat vehicle objects 101-104 manipulated by the user. When contacting with the obstacle object 105 arranged within the field, the cannonball 111 destroys a part of the obstacle object 105 without being reflected.

The operation for the enemy object 110 is controlled by the object control processing unit 22 of the processing unit 10. The object control processing unit 22 performs the operation, such as move and attack, of the enemy object 110, based on the algorithm set by the game program 9. The enemy object 110 is opposed to all of the combat vehicle objects 101-104, and cannot set the team with them. The game of the alternative embodiment may not always require destruction of the enemy object 110. In the game of the alternative embodiment, the last one of combat vehicle objects 101-104 is treated as the winning object, regardless of whether the enemy object 110 is destroyed.

The combat vehicle objects 101-104 can obtain the ability of the enemy object 110 when having attacked and then destroyed the enemy object 110. As shown in FIG. 12B, the combat vehicle 104 having destroyed the enemy object 110 is changed to have three cannon barrels at the cannon barrel portion 104b that are directed in the front, left and right directions. The combat vehicle object 104 having that shape can simultaneously launch three cannonballs 111 in the front, left and right directions, similarly to the enemy object 110. The launched cannonball 111 has a bigger size and can destroy the obstacle object 105, similarly to the cannonball 111 of the enemy object 110. When that combat vehicle object 104 sets the team with other combat vehicle objects 101-103, the number of cannonballs 111 to be launched from each cannon barrel included in said other combat vehicle objects 101-103 is increased.

As described above, the game contains the enemy object 110 that cannot be manipulated by the user and whose attack power is set higher. Thus, it is possible to widen the tactics that can be selected by the user, and to amuse the user much more. It is configured that the ability of the enemy object 110 is transferred to the combat vehicle objects 101-104 having destroyed the enemy object 110 to increase the attack power of the combat vehicle objects 101-104. That configuration generates the advantage of destroying the enemy object 110 that does not directly relate to the win and defeat of the game.

It should be noted that the appearance, ability and the like of the enemy object 110 explained in the present alternative embodiment are mere examples, and that the present technology is not limited to the examples. For example, the enemy object 110 may be present at the time when the game starts. For example, the enemy object 110 may be developed, when a predetermined time elapses after the game starts. For example, the enemy object 110 may be developed, when the number of remaining combat vehicle objects 101-104 becomes a predetermined number. The enemy object 110 may be developed under a condition other than above. It may be configured to provide not all the ability of the enemy object 110 to the combat vehicle objects 101-104 having destroyed the enemy object 110. For example, it may be configured to provide only the ability for launching the cannonballs 108 in three directions, to the combat vehicle objects 101-104. For example, it may be configured to provide the combat vehicle objects 101-104 only with the ability for destroying the obstacle object 105. It may be configured to provide the combat vehicle objects 101-104 with other abilities.

It should be understood that, in this specification, an element represented in a singular form with "a" or "an" put in front of a word does not exclude a plural form of such element.

The game system according to the present embodiment does not require to decide about the team setup before the game starts, and can decide the team setup after the game starts or during the game. The user can perform the manipulation for setting the team with another user after the game starts.

What is claimed is:

1. A non-transitory recording medium recording a program that makes a computer of a game apparatus including a memory device configured to store a list of plural objects, a transceiver, and a display coupled to the computer, based on an input manipulation, by a plurality of users, of controllers coupled to the game apparatus, to perform processing regarding a game in which plural objects compete in a virtual space and attack each other, wherein the program makes the computer to perform at least:
  object controlling for controlling an operation of an object responsive to an input manipulation of a controller by a user; and
  noncompetitive relationship setting for setting a noncompetitive relationship between a first object, which is any object among said plural objects, and a second object, which is any object among said plural objects and which is different than said first object, which are in a competitive relationship in the virtual space about a competition in the game when a predetermined operation is performed for said first object relative to said second object, in response to a receipt by the transceiver of a signal corresponding to an input manipulation, wherein the noncompetitive relationship comprises said first and second objects being on the same team, and wherein the program makes the computer to perform noncompetitive-relationship resolving for resolving the noncompetitive relationship which is set between said first object and said second object by performing the predetermined operation, when a predetermined dissolution condition is satisfied, wherein by the predetermined operation, said first and second objects become close to each other in a predetermined range without attacking each other.

2. The recording medium according to claim 1, wherein plural objects attack each other in the game, and the program makes the computer to perform attack disabling for disabling an attack between said first and second objects for which the noncompetitive relationship is set.

3. The recording medium according to claim 2, wherein the program makes the computer to perform attack-ability determining for determining whether one of said first and second objects is in a range where the other one of said first and second objects can attack the one of said first and second objects, and the computer sets the noncompetitive relationship for said first and second objects, when it determines that one of said first and second objects is in a range where the other one of said first and second objects can attack the one of said first and second objects, and when the predetermined operation is performed for said first and second objects.

4. The recording medium according to claim 3, wherein in the attack-ability determining the computer makes a determination in accordance with a relative position of said first and second objects.

5. The recording medium according to claim 3, wherein in the attack-ability determining the computer makes a determination in accordance with an attack direction of said first and second objects.

6. The recording medium according to claim 3, wherein said first and second objects can attack each other, when the predetermined operation is not performed for said first and second objects in a case where in the attack-ability determining the computer determines that one of said first and second objects is in a range where the other one of said first and second objects can attack the one of said first and second objects.

7. The recording medium according to claim 2, wherein the program makes the computer to perform non-attack-ability setting for setting a non-attack-ability for a predetermined period to one of the plural objects, when said one of the plural objects attacks.

8. The recording medium according to claim 7, wherein the program makes the computer to perform object display processing for performing processing for displaying the object on the display, and in the object display processing the computer performs processing for displaying the object in a recognizable manner whether each object of the plural objects can attack or not.

9. The recording medium according to claim 2, wherein the program makes the computer to perform:
attack determining for determining whether an attack of each object of the plural objects succeeds or fails;
defeat determining for determining whether or not an attacked object is defeated in accordance with a determination result of the attack determining; and
win determining for determining a winning object in the game in accordance with a determination result of the defeat determining.

10. The recording medium according to claim 9, wherein in the win determining the computer determines an object as the winning object when the object becomes an only one remaining undefeated.

11. The recording medium according to claim 2, wherein the program makes the computer to perform attack-power increasing for increasing an attack power of said first and second objects for which a noncompetitive relationship is set, when in the noncompetitive relationship setting the computer sets the noncompetitive relationship.

12. The recording medium according to claim 11, wherein in the attack-power increasing the computer increases the attack power based on a number of objects for which the noncompetitive relationship is set.

13. The recording medium according to claim 2, wherein the program makes the computer to perform enemy-object controlling for controlling an operation of an enemy object independently from the input manipulation and attacking the plural objects.

14. The recording medium according to claim 13, wherein the enemy object has an attack power higher than the plural objects.

15. The recording medium according to claim 3, wherein by the predetermined operation, said first and second objects become close to each other in a predetermined range smaller than the range with which the attack-ability determining makes a determination.

16. The recording medium according to claim 1, wherein by the predetermined operation, said first and second objects or pertaining objects respectively applied in a separable manner to the objects come into contact with each other.

17. The recording medium according claim 1, wherein in the noncompetitive relationship setting the computer sets the noncompetitive relationship for said first and second objects and another object different than said first and second objects, when the predetermined operation is performed in order for one object of said first and second objects for which the noncompetitive relationship is set and in order for said another object for which the noncompetitive relationship is not set.

18. The recording medium according to claim 1, wherein when the predetermined operation is performed for one of two or more objects for which a first noncompetitive relationship is set and for one of two or more objects for which a second noncompetitive relationship is set, in the noncompetitive relationship setting the computer sets the first noncompetitive relationship or the second noncompetitive relationship to said first and second objects for which the predetermined operation is performed.

19. The recording medium according to claim 1, wherein the dissolution condition indicates that one noncompetitive relationship is set for all the objects.

20. The recording medium according to claim 1, wherein the program makes the computer to perform input-manipulation accepting for accepting plural input manipulations, and
in the object controlling the computer associates an accepted manipulation with the object, and controls an operation of the plural objects.

21. The recording medium according to claim 20, wherein the program makes the computer to perform object display processing for performing processing for displaying the object, and
in the object display processing the computer performs display processing for displaying information for recognizing a manipulator of each object of the plural objects, after win or defeat for the game is decided.

22. The recording medium according to claim 21, wherein in the object display processing the computer performs processing for displaying the object in such a manner that a manipulator for each object of the plural objects cannot be recognized, before the win or defeat for the game is decided.

23. The recording medium according to claim 20, wherein in the input-manipulation accepting the computer accepts plural input manipulations through a network.

24. A game processing method for performing processing, regarding a game in which plural objects compete in a virtual space and attack each other, with a game apparatus including a computer, a memory device configured to store a list of plural objects, a transceiver, and a display coupled to the computer, in accordance with an input manipulation, by a plurality of users, of controllers coupled to the game apparatus, the computer performing at least:
controlling an operation of an object responsive to an input manipulation of a controller by a user; and
setting a noncompetitive relationship between a first object, which is any object among said plural objects, and a second object, which is any object among said plural objects and which is different than said first object, which are in a competitive relationship in the virtual space about a competition in the game when a predetermined operation is performed for said first object relative to said second object, in response to a receipt by the transceiver of a signal corresponding to an input manipulation, wherein
the noncompetitive relationship comprises said first and second objects being on the same team, and wherein
the computer performs noncompetitive-relationship resolving for resolving the noncompetitive relationship which is set between said first object and said second object by performing the predetermined operation, when a predetermined dissolution condition is satisfied, wherein
by the predetermined operation, said first and second objects become close to each other in a predetermined range without attacking each other.

25. A game apparatus that performs processing regarding a game in which plural objects compete in a virtual space and attack each other, the game apparatus including a computer, a memory device configured to store a list of plural objects, a transceiver, and a display coupled to the computer, the computer, in accordance with an input manipulation, by a plurality of users, of controllers coupled to the game apparatus, configured to perform at least:
object controlling for controlling an operation of an object responsive to an input manipulation of a controller by a user; and
noncompetitive relationship setting for setting a noncompetitive relationship between a first object, which is any object among said plural objects, and a second object, which is any object among said plural objects and which is different than said first object, which are in a competitive relationship in the virtual space about a competition in the game when a predetermined operation is performed for said first object relative to said second object, in response to a receipt by the transceiver of a signal corresponding to an input manipulation, wherein
the noncompetitive relationship comprises said first and second objects being on the same team, and wherein
the computer performs noncompetitive-relationship resolving for resolving the noncompetitive relationship which is set between said first object and said second object by performing the predetermined operation, when a predetermined dissolution condition is satisfied, wherein
by the predetermined operation, said first and second objects become close to each other in a predetermined range without attacking each other.

26. A game system that performs processing regarding a game in which plural objects compete in a virtual space and attack each other, the game system including a computer, a memory device configured to store a list of plural objects, a transceiver, and a display coupled to the computer, the computer, in accordance with an input manipulation, by a plurality of users, of controllers coupled to the game apparatus, configured to perform at least:
object controlling for controlling an operation of an object responsive to an input manipulation of a controller by a user; and
noncompetitive relationship setting for setting a noncompetitive relationship between a first object, which is any object among said plural objects, and a second object, which is any object among said plural objects and which is different than said first object, which are in a competitive relationship in the virtual space about a competition in the game when a predetermined operation is performed for said first object relative to said second object, in response to a receipt by the transceiver of a signal corresponding to an input manipulation, wherein
the noncompetitive relationship comprises said first and second objects being on the same team, and wherein
the computer performs noncompetitive-relationship resolving for resolving the noncompetitive relationship which is set between said first object and said second object by performing the predetermined operation, when a predetermined dissolution condition is satisfied, wherein
by the predetermined operation, said first and second objects become close to each other in a predetermined range without attacking each other.

* * * * *